(12) United States Patent
Skorheim et al.

(10) Patent No.: US 11,347,221 B2
(45) Date of Patent: May 31, 2022

(54) ARTIFICIAL NEURAL NETWORKS HAVING COMPETITIVE REWARD MODULATED SPIKE TIME DEPENDENT PLASTICITY AND METHODS OF TRAINING THE SAME

(71) Applicant: HRL LABORATORIES, LLC, Malibu, CA (US)

(72) Inventors: Steven W. Skorheim, Malibu, CA (US); Nigel D. Stepp, Santa Monica, CA (US); Ruggero Scorcioni, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 407 days.

(21) Appl. No.: 16/661,637

(22) Filed: Oct. 23, 2019

(65) Prior Publication Data

US 2020/0133273 A1    Apr. 30, 2020

Related U.S. Application Data (60) Provisional application No. 62/752,190, filed on Oct. 29, 2018.

(51) Int. Cl.
*G06N 3/04* (2006.01)
*G06N 3/08* (2006.01)
(Continued)

(52) U.S. Cl.
CPC ......... *G05D 1/0088* (2013.01); *G05D 1/0221* (2013.01); *G05D 1/101* (2013.01);
(Continued)

(58) Field of Classification Search
CPC .... G05D 1/0088; G05D 1/0221; G05D 1/101; G05D 2201/0213; G06N 3/04; G06N 3/08

See application file for complete search history.

(56) References Cited

U.S. PATENT DOCUMENTS

| | | |
|---|---|---|
| 2017/0135621 A1 | 5/2017 | Lee et al. |
| 2018/0247160 A1 | 8/2018 | Moshen et al. |
| 2018/0253095 A1 | 9/2018 | Ryan |

FOREIGN PATENT DOCUMENTS

| | | |
|---|---|---|
| KR | 10-2017-005708 A | 5/2017 |
| WO | WO 2018/094375 A1 | 5/2018 |

OTHER PUBLICATIONS

Sanda et al., "Multi-layer network utilizing rewarded spike time dependent plasticity to learn a foraging task," PLOS Computational Biology, 25 pages, Sep. 2017.

(Continued)

*Primary Examiner* — Mathew Franklin Gordon
(74) *Attorney, Agent, or Firm* — Lewis Roca Rothgerber Christie LLP (57) ABSTRACT

A method of training an artificial neural network having a series of layers and at least one weight matrix encoding connection weights between neurons in successive layers. The method includes receiving, at an input layer of the series of layers, at least one input, generating, at an output layer of the series of layers, at least one output based on the at least one input, generating a reward based on a comparison of between the at least one output and a desired output, and modifying the connection weights based on the reward. Modifying the connection weights includes maintaining a sum of synaptic input weights to each neuron to be substantially constant and maintaining a sum of synaptic output weights from each neuron to be substantially constant.

20 Claims, 6 Drawing Sheets

(51) Int. Cl.
  *G05D 1/00* (2006.01)
  *G05D 1/02* (2020.01)
  *G05D 1/10* (2006.01)
(52) U.S. Cl.
  CPC ................ *G06N 3/04* (2013.01); *G06N 3/08* (2013.01); *G05D 2201/0213* (2013.01)

(56) References Cited

OTHER PUBLICATIONS

International Search Report and the Written Opinion of the International Searching Authority dated Feb. 11, 2020, Issued in corresponding International Application No. PCT/2019/057642, 11 pages.

ARTIFICIAL NEURAL NETWORKS HAVING COMPETITIVE REWARD MODULATED SPIKE TIME DEPENDENT PLASTICITY AND METHODS OF TRAINING THE SAME

CROSS-REFERENCE TO RELATED APPLICATION(S)

The present application claims priority to and the benefit of U.S. Provisional Application No. 62/752,190, filed Oct. 29, 2018, the entire contents of which are incorporated herein by reference.

BACKGROUND

Artificial neural networks are increasingly utilized to perform complex tasks, such as image recognition, computer vision, speech recognition, and medical diagnoses. Artificial neural networks are commonly trained by being presented with a set of examples that have been manually identified as either a positive training example (e.g., an example of the type of image or sound the artificial neural network is intended to recognize or identify) or a negative training example (e.g., an example of the type of image or sound the artificial neural network is intended not to recognize or identify).

Artificial neural networks include a collection of nodes, referred to as artificial neurons, connected to each other via synapses. Additionally, the artificial neurons are typically aggregated into layers, such as an input layer, an output layer, and one or more hidden layers between the input and output layers, that may perform different kinds of transformations on their inputs. Artificial neural networks may be either a non-spiking neural network or a spiking neural network. In spiking neural networks, the artificial neurons spike when they reach a certain potential and then their potential is reset, according, for instance, to the Leaky integrate-and-fire (LIF) model.

In non-spiking artificial neural networks, the connections between the neurons have weights that are adjusted as the artificial neural network learns, which increase or decrease the strength of the signal at the connection depending on whether the connection between those neurons produced a desired behavior of the network (e.g., the correct classification of an image or a sound). Some artificial neural networks learn response patterns through reward modulated spike time dependent plasticity (RSTDP), which records events in which one neuron caused another to fire and then strengthens or weakens the related synapses depending on the value of a reward signal received thereafter. Previous research has developed neuromorphic networks that leverage RSTDP to assist in character recognition with the help of a linear classifier applied to the output layer. Other systems have used RSTDP for navigation tasks. However, related art systems utilizing RSTDP generally allow some connections to increase in strength until they saturate by reaching a limit set by their equations for the individual synapse. Additionally, some related art systems utilizing RSTDP train the network by applying rewards that favor strengthening connections between neurons associated with frequent experiences. Thus, these related art systems are biased toward frequent stimuli and against relatively infrequent stimuli, and therefore these related art systems may not perform well when presented with these infrequent stimuli.

SUMMARY

The present disclosure is directed to various methods of training an artificial neural network having a series of layers and at least one weight matrix encoding connection weights between neurons in successive layers of the series of layers. In one embodiment, the method includes receiving, at an input layer of the series of layers, at least one input, generating, at an output layer of the series of layers, at least one output based on the at least one input, generating a reward based on a comparison between the at least one output and a desired output, and modifying the connection weights based on the reward. The modifying of the connection weights includes maintaining a sum of synaptic input weights to each neuron to be substantially constant and maintaining a sum of synaptic output weights from each neuron to be substantially constant.

The method may also include adjusting the synaptic input and output weights of each neuron according to Equation 1, wherein Equation 1 is:

$$W_n = W_{n-1} * 0.9 + W_{n-1} * \frac{T_{target}}{T_{actual}} * 0.1,$$

wherein $T_{target}$ is a target sum of synaptic input or output weights, $T_{actual}$ is an actual sum of the synaptic input or output weights, $W_n$ is a current weight, and $W_{n-1}$ is a previous weight.

The adjusting of the synaptic input and output weights may be performed at a regular interval.

The regular interval may be approximately (about) 50 ms or less.

The method may also include averaging the reward over a run time of the artificial neural network to be substantially zero.

The averaging of the reward may include calculating a running average score of the reward according to Equation 2, wherein Equation 2 is $X_n=(X_{n-1}*(1-\alpha))+S_n*\alpha$, wherein $\alpha$ is a rate of adaptation and $S_n$ is a score for a given iteration.

The generating the reward may include calculating the reward according to Equation 3, wherein Equation 3 is $R_n=S_n-X_n$.

The present disclosure is also directed to various embodiments of a system. In one embodiment, the system includes a processor and a non-transitory computer-readable storage medium operably coupled to the processor. The non-transitory computer-readable storage medium has software instructions stored therein, which, when executed by the processor, cause the processor to process input parameters with an artificial neural network stored in the processor, generate, from the artificial neural network, at least one output based on the input parameters, generate a reward based on a comparison of between the output and a desired output, and modify connection weights between neurons in the artificial neural network based on the reward. The modifying of the connection weights includes maintaining a sum of synaptic input weights to each neuron to be substantially constant and maintaining a sum of synaptic output weights from each neuron to be substantially constant.

The system may also include a series of sensors configured to generate the input parameters.

The system may also include at least one vehicle component, wherein the processor is configured to control the at least one vehicle component based on the at least one output of the artificial neural network.

The software instructions, when executed by the processor, may further cause the processor to average the reward over a time period to be substantially zero.

The artificial neural network may include an input layer and an output layer, and each neuron of the input layer may be directly connected to each neuron of the output layer.

The artificial neural network may include an input layer, at least one hidden layer, and an output layer.

The present disclosure is also directed to various methods for controlling a vehicle component of a vehicle having a series of sensors and a processor in communication with the series of sensors. In one embodiment, the method includes receiving input parameters from the series of sensors, processing the input parameters with an artificial neural network stored in the processor, controlling the vehicle component based on output parameters calculated by the artificial neural network, determining a reward based on a comparison between a desired behavior of the vehicle and a behavior of the vehicle resulting from the controlling of the vehicle component, and modifying connection weights between neurons in the artificial neural network based on the reward. The modifying of the connection weights includes maintaining a sum of synaptic input weights to each neuron to be substantially constant and maintaining a sum of synaptic output weights from each neuron to be substantially constant.

The vehicle may be an autonomous vehicle.

The autonomous vehicle may be an autonomous automobile or an autonomous aerial vehicle.

The reward may be calculated when the controlling of the vehicle causes the vehicle to get closer to a target.

A value of the reward may be calculated in proportion to a decrease in distance between the vehicle and a target after the controlling of the vehicle.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of an artificial neural network having competitive reward modulated spike time dependent plasticity (cRSTDP) and methods of training a neural network. The artificial neural network of the present disclosure may be suitable for use in controlling an autonomous vehicle, such as an autonomous automobile or an autonomous aerial vehicle (e.g., a drone). The artificial neural network and the method of training an artificial neural network according to various embodiments of the present disclosure utilize weight normalization in which the sum of the weights at each neuron in the neural network are held constant or substantially constant as the connection weights between the neurons are adjusted based on an applied reward during training (e.g., the total strength of the synaptic inputs to each neuron are held to a constant or substantially constant value, and the total strength of the synaptic outputs from each neuron are held to a constant or substantially constant value). Weight normalization creates competition for a limited potential synaptic strength between the neurons and thereby prevents or protects the neurons from having excessive input or output strength (e.g., weight normalization prevents the connection weights between neurons from saturating). Additionally, the artificial neural network and the method of training an artificial neural network according to various embodiments of the present disclosure utilize a zero-sum reward training method in which the long-term average of the reward value is zero or substantially zero. Zero-sum reward training of the neural network prevents or protects more commonly presented stimulus response pairs from having a competitive advantage over less commonly presented stimulus response pairs (e.g. zero-sum reward training of the neural network allows the neural network to learn from both rare and common experiences).

Figure 1:
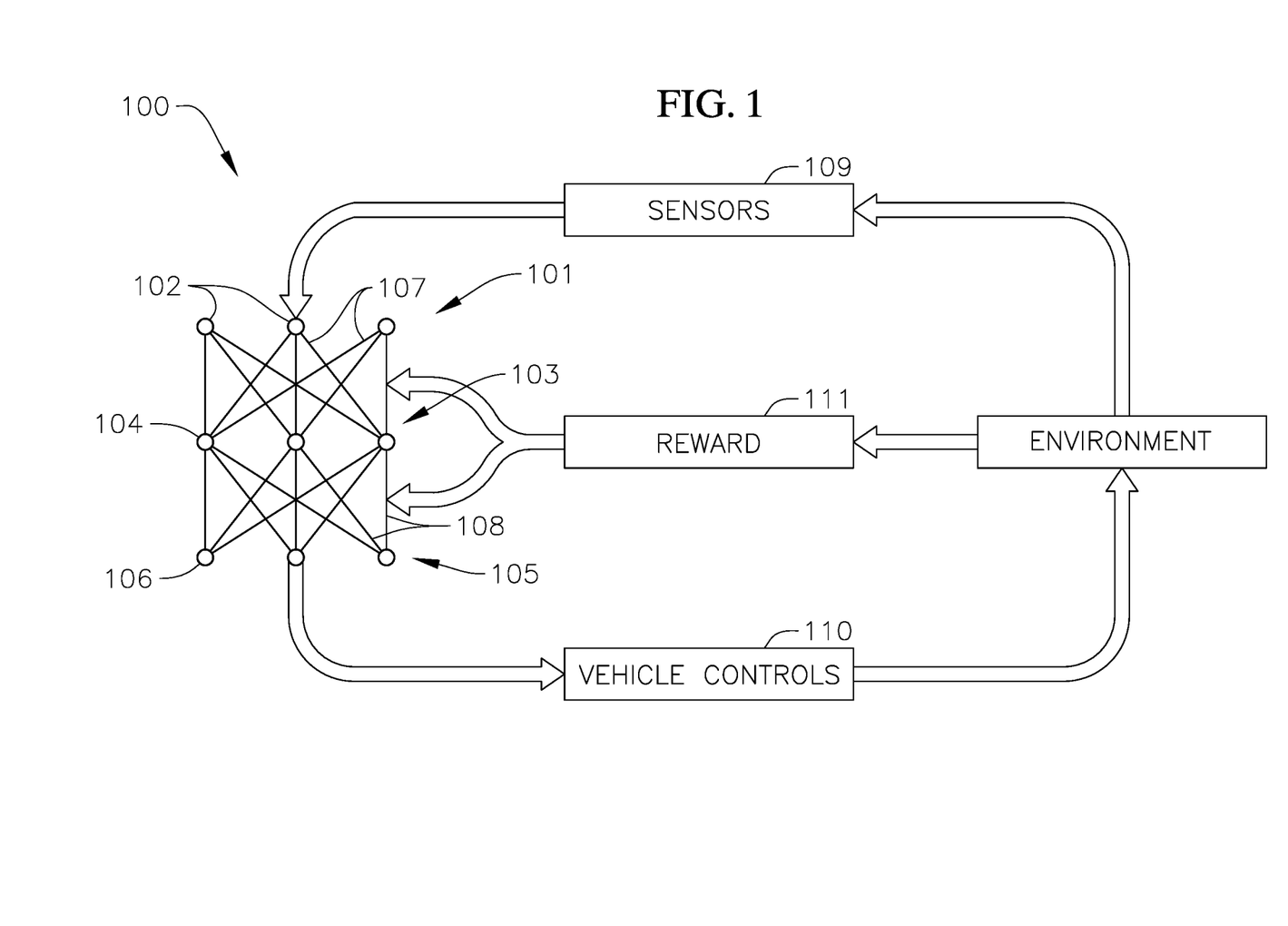
FIG. 1 is a schematic view of an artificial neural network according to one embodiment of the present disclosure utilized to control an autonomous vehicle.

FIG. 1 depicts an artificial neural network 100 according to one embodiment of the present disclosure implemented into the control system of an autonomous or semi-autonomous vehicle, such as an autonomous automobile or an autonomous aerial vehicle. The artificial neutral network 100 may be stored on non-transitory computer-readable storage medium (e.g., computer memory) which, when executed by a processor, causes the artificial neural network 100 to learn to control the autonomous or semi-autonomous vehicle, such as navigating the vehicle toward a series of waypoints, based on a reward system that strengthens the connection weight between neurons in the artificial network 100 when the firing of those neurons resulted in a successful outcome (e.g., moving the vehicle closer to one of the waypoints).

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example a processor may include two processors, an FPGA and a CPU, interconnected on a PWB.

In the embodiment illustrated in FIG. 1, the artificial neural network 100 includes an input layer 101 including a series of neurons 102, one or more hidden layers 103 each including a series of neurons 104, and an output layer 105 including a series of neurons 106. Although in the illustrated embodiment the artificial neural network 100 includes a single hidden layer 103, in one or more embodiments, the artificial neural network 100 may include any other suitable number of hidden layers depending, for instance, on the desired complexity of information that the artificial neural network 100 is capable of learning. Additionally, in one or more embodiments, the artificial neural network 100 may be provided without any hidden layers 103 (e.g., the input layer 101 may be directly connected to the output layer 105). In the illustrated embodiments, a series of connections 107 connect each of the neurons 102 in the input layer 101 to each of the neurons 104 in the hidden layer 103, and a series of connections 108 connect each of the neurons 104 in the hidden layer 103 to each of the neurons 106 in the output layer 105. Moreover, each of the connections 107, 108 between the neurons 102, 104, 106 in adjacent layers 101, 103, 105 have a connection weight.

The neurons 102 in the input layer 101 receive input from one or more sensors 109 (e.g., one or more sensors provided on the vehicle that the artificial neural network is configured to control). In one or more embodiments, the number of sensors 109 may depend, for instance, on the amount of information the artificial neural network 100 has available. The sensors 109 may be any suitable type or kind of sensors depending on the type or kind of parameters the sensors 109 are designed to detect and/or the type or kind of vehicle the sensors 109 are provided on or in. For instance, in one or more embodiments, the sensors 109 may be target angle sensors configured to detect the relative angle of the target (e.g., a waypoint) to the orientation of the vehicle. In one or more embodiments, the sensors 109 may include distance sensors (e.g., laser distance sensors) configured to measure the distance between the target (e.g., a waypoint) and the vehicle. In one or more embodiments, the waypoint may be any suitable type or kind of waypoint, such as, for instance, an immobile or substantially immobile target in a direct driving point of a vehicle. In one or more embodiments, the number of neurons 102 in the input layer 101 depends on the number of sensors 109. In one or more embodiments, the input layer 101 includes at least one neuron 102 for each sensor 109. Although in the illustrated embodiment the input layer 101 includes three neurons 102 corresponding to three input sensors 109, in one or more embodiments the input layer 101 may include any other suitable number of neurons 102 depending on the number of sensors 109 utilized in the vehicle.

The neurons 106 in the output layer 105 are configured to control one or more vehicle controls 110 on the vehicle, such as steering controls of an autonomous or semi-autonomous automobile or the rotor controls of an autonomous or semi-autonomous aerial vehicle. In one or more embodiments, the number of neurons 106 in the output layer 105 corresponds to the number of vehicle controls 110 that the artificial neural network 100 is configured to control. Accordingly, although in the illustrated embodiment the output layer 105 includes three neurons 106, in one or more embodiments the output layer 105 may include any other suitable number of neurons 106 depending on the number of vehicle controls 110 that the artificial neural network 100 is configured to control.

In the illustrated embodiment, the artificial neural network 100 is trained by applying a reward 111 (e.g., a feedback signal) to the artificial neural network 100. The reward 111 is configured to adjust the weights of the connections 107, 108 between the neurons 102, 104, 106 depending on the behavior of the vehicle compared to a desired behavior. When desired behaviors occur, the reward 111 is applied to the artificial neural network 100 to adjust the weights of the connections 107, 108 between the neurons 102, 104, 106 such that the desired responses to the inputs become more likely. A score value of the reward 111 can depend on any event which represents a desired event or goal. For instance, in one or more embodiments, the reward 111 may be applied to the artificial neural network 100 whenever the vehicle (e.g., the automobile) gets closer to a target (e.g., a waypoint). In one or more embodiments, the value of the reward 111 applied to the artificial neural network 100 may be proportional to the decrease in the distance between the vehicle and the target (e.g., a waypoint). In one or more embodiments, the reward 111 may be applied only when the vehicle successfully reaches the target (e.g., a waypoint). In one or more embodiments, these different reward regimes result in different training times of the artificial neural network 100. For instance, in one or more embodiments, applying the reward 111 whenever the vehicle gets closer to the target trains the artificial neural network 100 faster than applying the reward 111 in proportion to the decrease in the distance between the vehicle and the target, and/or applying the reward 111 only when the vehicle successfully reaches the target.

In one or more embodiments, the reward 111 applied to train the artificial neural network 100 utilizes weight normalization in which, for each neuron 102, 104, 106, the sum of the synaptic input weights to that neuron 102, 104, 106 are held constant or substantially constant as the weights of the connections 107, 108 between the neurons 102, 104, 106 are adjusted based on the applied reward 111 (e.g., the total strength of the synaptic inputs to each neuron 102, 104, 106 are held at a constant or substantially constant value). Accordingly, any time a presynaptic input weight to a neuron 102, 104, 106 is changed, all other presynaptic input weights to that same neuron 102, 104, 106 are updated to maintain the same or substantially the same total weight contribution to that neuron 102, 104, 106. In one or more embodiments, the presynaptic weights that are adjusted to maintain the constant or substantially constant value may all be adjusted equally or they may be adjusted in proportion to their previous presynaptic weight. Additionally, in one or more embodiments, the weight normalization also maintains the sum of the synaptic output weights from each neuron 102, 104, 106 at a constant or substantially constant value as the weights of the connections 107, 108 between the neurons 102, 104, 106 are adjusted based on the applied reward 111 (e.g., the total strength of the synaptic outputs from each neuron 102, 104, 106 are held to a constant or substantially constant value). Accordingly, any time a synaptic output weight from a neuron 102, 104, 106 is changed, all other synaptic output weights from that same neuron 102, 104, 106 are updated to maintain the same or substantially the same total weight contribution from that neuron 102, 104, 106. In one or more embodiments, the synaptic output weights (that are adjusted to maintain the constant or substantially constant value) may all be adjusted equally or they may be adjusted in proportion to their previous synaptic output weight. Weight normalization creates competition for a limited potential synaptic strength between the neurons 102, 104, 106 and thereby prevents or protects the neurons 102, 104, 106 from having excessive input or output strength (e.g., weight normalization prevents or protects the weights of the connections 107, 108 between the neurons 102, 104, 106 from saturating).

Additionally, in one or more embodiments, training the artificial neural network 100 also includes adjusting the weights of each of the connections 107, 108 to adjust the total sum of the connection weights back toward a pre-set target. The weights of the connections 107, 108 may be adjusted at a predetermined regular interval, such as, for instance, 50 ms (or approximately or about 50 ms) or less. In one or more embodiments, the interval at which the weights of the connections 107, 108 are adjusted may be any time that is less than the weight dynamics, which is configured to ensure that the weights of the connections 107, 108 do not have sufficient time to move significantly out of their intended range. In one or more embodiments, the weights of each of the connections 107, 108 may be adjusted according to Equation 1 as follows:

$$W_n = W_{n-1} * 0.9 + W_{n-1} * \frac{T_{target}}{T_{actual}} * 0.1 \quad \text{(Equation 1)}$$

wherein $W_n$ is an updated weight of given connections 107, 108, and $W_{n-1}$ is a previous weight of the connections 107, 108, $T_{target}$ is a target sum of synaptic input and output weights, and $T_{actual}$ is an actual sum of the synaptic input and output weights.

In one or more embodiments, training the artificial neural network 100 includes normalizing the long-term average of the reward 111 to be zero or near zero (e.g., approximately or about zero). A zero-sum reward 111 is configured to prevent or protect commonly presented stimulus response pairs from having a competitive advantage over less frequent stimulus response pairs (e.g. zero-sum reward 111 training of the neural network 100 allows the neural network 100 to learn from both rare and common experiences). For instance, in one or more embodiments in which the inputs to the input layer 101 are from distance and target angle sensors 109 in a vehicle, the zero-sum reward 111 is configured to prevent or protect the inputs from the distance sensors 109, which may update more frequently than the target angle sensors 109, from having a greater impact on the training of the artificial neural network 100 than the target angle sensors 109. In one or more embodiments, the running average score of the reward 111 is calculated according to Equation 2 as follows:

$$X_n = (X_{n-1}*(1-\alpha)) + S_n*\alpha \quad \text{(Equation 2)}$$

where $\alpha$ is a rate of adaptation and $S_n$ is a score for a given iteration. The rate of adaptation a can be arbitrarily selected and it determines the timescale of averaging. The rate of adaptation a is how quickly the algorithm adjusts when the average score changes. A higher rate of adaptation a value will make this algorithm focus more strongly on recent scores. The score $S_n$ is an evaluation of how close the result of the previous outputs was to the desired outputs. The reward 111 is then calculated according to Equation 3 as follows:

$$R_n = S_n - X_n \quad \text{(Equation 3)}$$

Figure 2A:
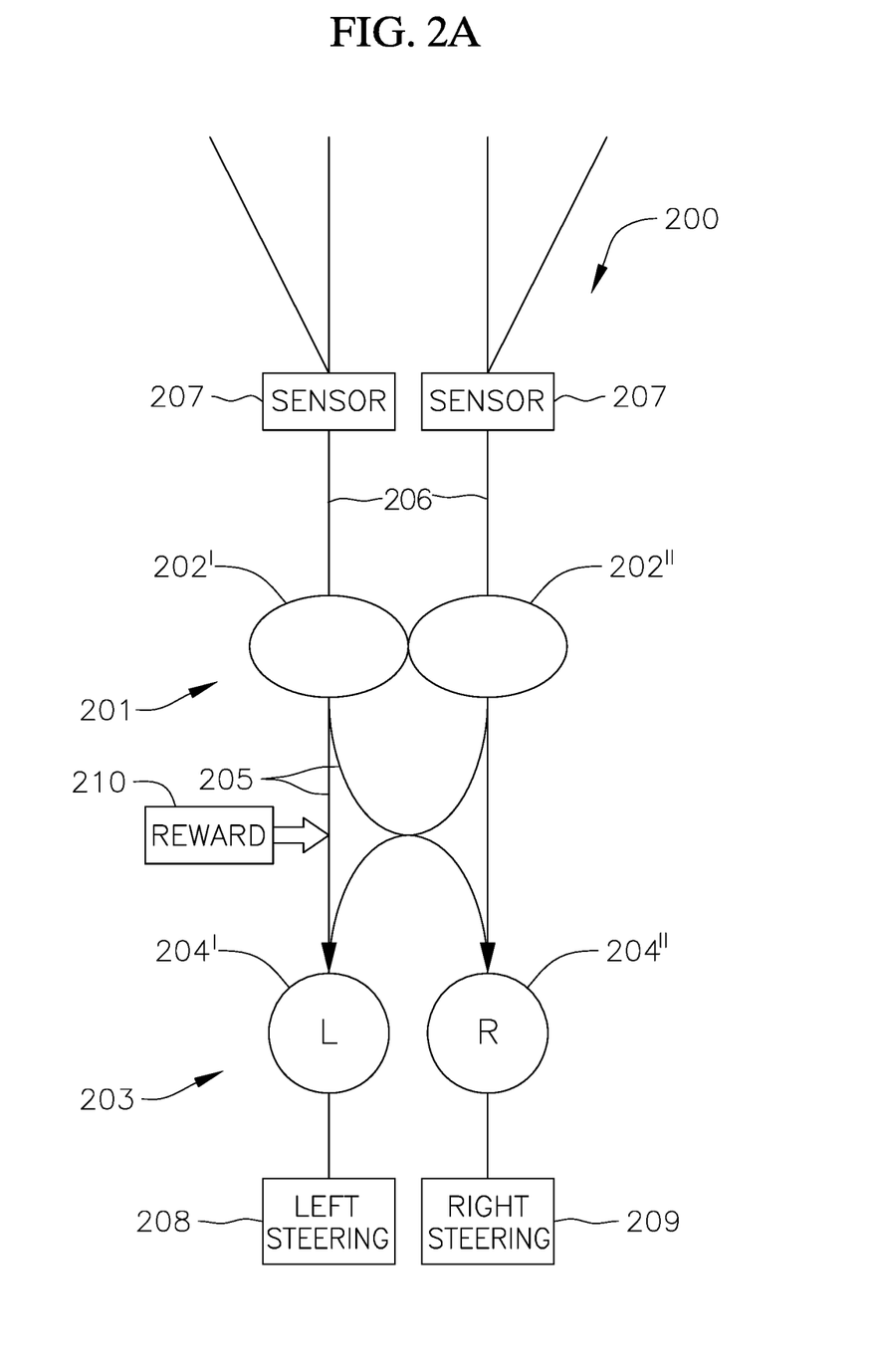
FIGS. 2A and 2B depict an artificial neural network according to one embodiment of the present disclosure utilized to control an autonomous automobile and an autonomous aerial vehicle, respectively.

FIG. 2A depicts an artificial neural network 200 according to one embodiment of the present disclosure utilized to control an autonomous automobile. In the illustrated embodiment, the artificial neural network 200 includes an input layer 201 having two input neurons 202', 202" and an output layer 203 having two output neurons 204', 204". The neurons 202', 202" in the input layer 201 are directly connected with connections 205 to the neurons 204', 204" in the output layer 203 in an all-to-all manner. The neurons 202', 202" in the input layer 201 receive signal inputs 206 from target angle sensors 207 (e.g., sensors configured to detect the relative angle of a target to the orientation of the autonomous vehicle). In the illustrated embodiment, the neurons 202', 202" in the input layer 201 receive input signals 206 proportional to the angle between the direction of motion of the vehicle and the target location. The neurons 204', 204" in the output layer 203 control left and right steering controls 208, 209, respectively, of the autonomous automobile (e.g., the output of one neuron 204' in the output layer 203 is configured to steer the automobile to the left, and the output of the other neuron 204" in the output layer 203 is configured to steer the automobile to the right).

The neurons 202', 202" in the input layer 201 are initially connected by the connections 205 to the neurons 204', 204" in the output layer 203 with equal weights, and the artificial neural network 200 is trained by applying a reward 210 to adjust the weight of the connections 205 between the neurons 202', 202" and 204', 204" based on a desired action of the automobile such that the desired responses to the inputs 206 become more likely. In one or more embodiments, the reward 210 may be applied to adjust the connection weights between the neurons 202', 202" and 204', 204" whenever the neurons 204', 204" in the output layer 203 control the steering controls 208, 209 and cause the automobile to get closer to the target. In one or more embodiments, the value of the reward 210 applied to the artificial neural network 200 may be proportional to the decrease in the distance between the automobile and the target caused by the neurons 204', 204" in the output layer 203 controlling the steering controls 208, 209. In one or more embodiments, the reward 210 may be applied to adjust the weights of the connections 205 between the neurons 202', 202" and 204', 204" only when the automobile successfully reaches the target. Additionally, the long-term average of the reward 210 may be normalized to be zero, approximately or about zero, or near zero (e.g., the artificial neural network 200 may be trained with a zero-sum reward 210, as described above).

Furthermore, in one or more embodiments, the reward 210 applied to train the artificial neural network 200 illustrated in FIG. 2A may utilize weight normalization, as described above, in which, for each neuron 202', 202", 204', 204", the sum of the synaptic input weights to that neuron 202', 202", 204', 204" are held constant or substantially constant and/or the sum of the synaptic output weights from that neuron 202', 202", 204', 204" are held at a constant or substantially constant value as the weights of the connections 205 between the neurons 202', 202", 204', 204" are adjusted based on the applied reward 210, which creates competition for a limited potential synaptic strength between the neurons 202', 202", 204', 204" and thereby prevents or protects the neurons 202', 202", 204', 204" from having excessive input or output strength (e.g., the total strength of the synaptic inputs to each neuron 202', 202", 204', 204" are held at a constant or substantially constant value and/or the total strength of the synaptic outputs from each neuron 202', 202", 204', 204" are held at a constant or substantially constant value).

Figure 2B:
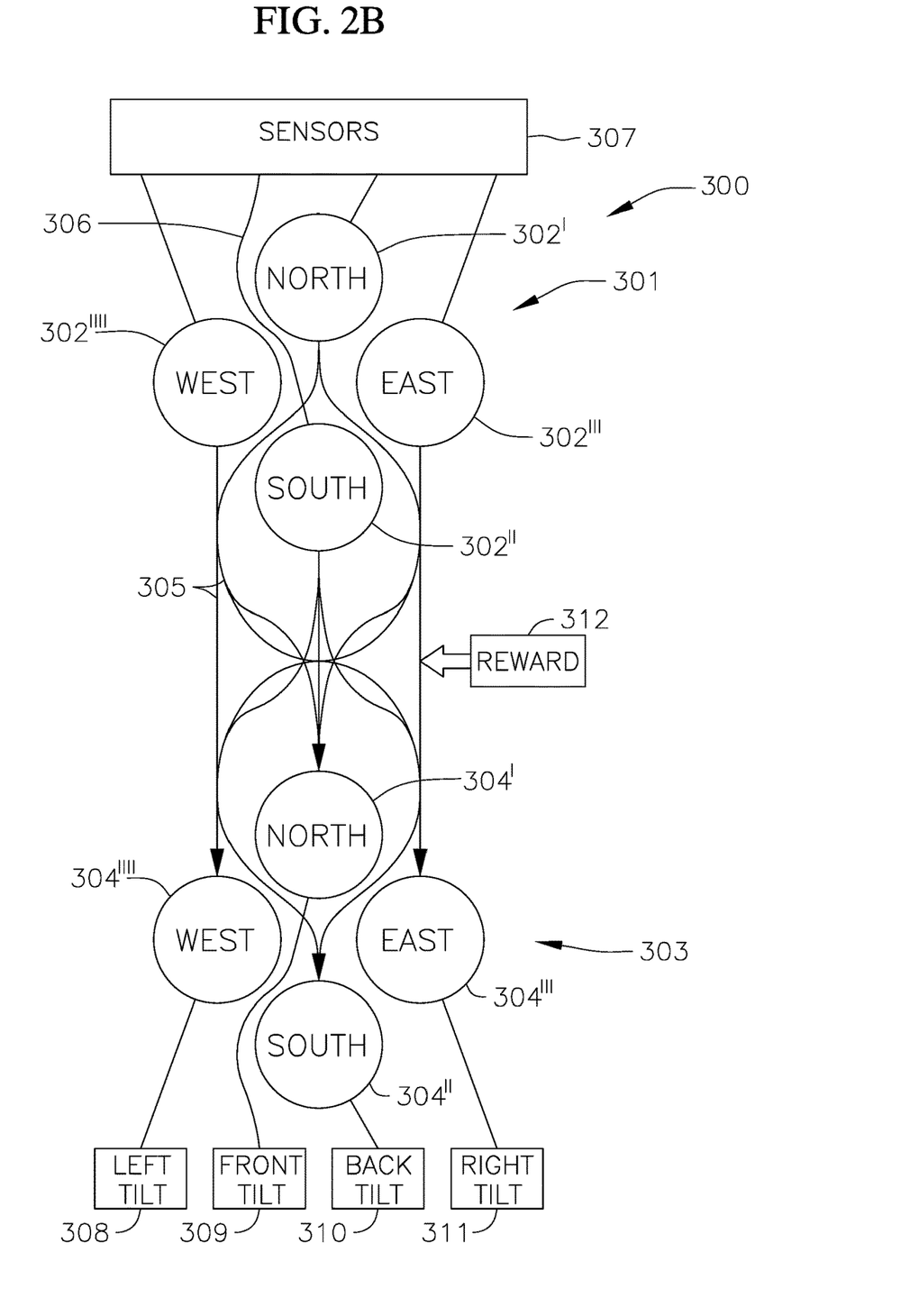

FIG. 2B depicts an artificial neural network 300 according to one embodiment of the present disclosure utilized to control an autonomous aerial vehicle. In the illustrated embodiment, the artificial neural network 300 includes an input layer 301 having four input neurons 302', 302", 302''', 302'''' and an output layer 303 having four output neurons 304', 304", 304''', 304''''. The neurons 302', 302", 302''', 302'''' in the input layer 301 are directly connected with connections 305 to the neurons 304', 304", 304''', 304'''' in the output layer 303 in an all-to-all manner. The neurons 302', 302", 302''', 302'''' in the input layer 301 receive signal inputs 306 from sensors 307 (e.g., sensors 307 configured to detect the relative angle of a target to the orientation of the autonomous aerial vehicle and the distance from the autonomous aerial vehicle to the target). In the illustrated embodiment, the neurons 302', 302", 302''', 302'''' in the input layer 301 receive input signals 306 proportional to the angle between the direction of motion of the vehicle and the distance to the target location. The neurons 304', 304", 304''', 304'''' in the output layer 303 control tilt controls 308, 309, 310, 311 of the autonomous aerial vehicle (e.g., the outputs of the neurons 304', 304", 304''', 304'''' in the output layer 303 are configured to tilt the autonomous aerial vehicle to the left, to the right, to the front, and to the back, respectively).

The neurons 302', 302", 302''', 302''' in the input layer 301 are initially connected, via the connections 305, to the neurons 304', 304", 304''', 304'''' in the output layer 303 with equal weights, and the artificial neural network 300 is trained by applying a reward 312 to adjust the weight of the connections 305 between the neurons 302'-302'''' and 304'-304'''' based on a desired action of the autonomous aerial vehicle such that the desired responses to the inputs 306 become more likely. In one or more embodiments, the reward 312 may be applied to adjust the connection weights between the neurons 302'-302'''' and 304'-304'''' whenever the neurons 304'-304'''' in the output layer 303 control the tilt controls 308, 309, 310, 311 and cause the autonomous aerial vehicle to get closer to the target. In one or more embodiments, the reward 312 may be applied to adjust the connection weights between the neurons 302'-302'''' and 304'-304'''' only when the autonomous aerial vehicle successfully reaches the target. Additionally, the long-term average of the reward 312 may be normalized to be zero, approximately or about zero, or near zero (e.g., the artificial neural network 300 may be trained with a zero-sum reward 312, as described above).

Furthermore, in one or more embodiments, the reward 312 applied to train the artificial neural network 300 illustrated in FIG. 2B may utilize weight normalization, as described above, in which, for each neuron 302'-302'''' and 304'-304'''', the sum of the synaptic input weights to that neuron 302'-302'''' and 304'-304'''' are held constant or substantially constant and/or the sum of the synaptic output weights from that neuron 302'-302'''' and 304'-304'''' are held at a constant or substantially constant value as the connection weights between the neurons 302'-302'''' and 304'-304'''' are adjusted based on the applied reward 312, which creates competition for a limited potential synaptic strength between the neurons 302'-302'''' and 304'-304'''' and thereby prevents or protects the neurons 302'-302'''' and 304'-304'''' from having excessive input or output strength (e.g., the total strength of the synaptic inputs to each neuron 302'-302'''' and 304'-304'''' are held at a constant or substantially constant value and/or the total strength of the synaptic outputs from each neuron 302'-302'''' and 304'-304'''' are held at a constant or substantially constant value).

Figure 3A:
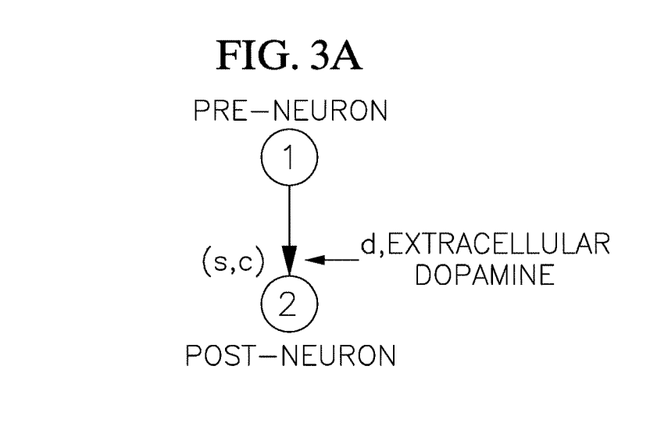
FIGS. 3A-3C depict the dependency of reward modulated spike time dependent plasticity (RSTDP) on pre- and post-synaptic neuron spike timing and the arrival of a reward.
Figure 3B:
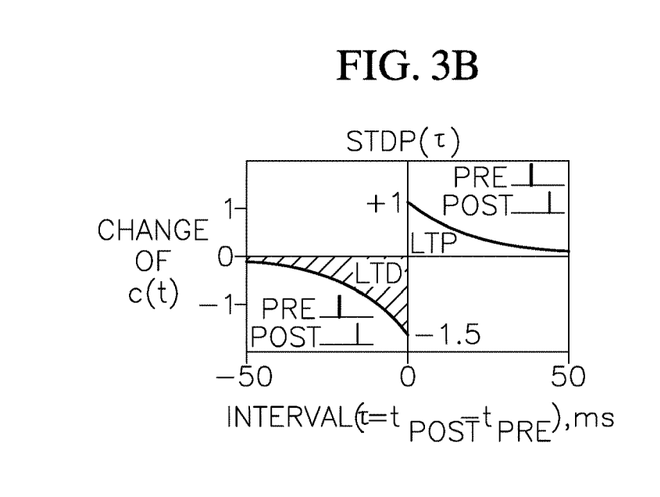
Figure 3C:
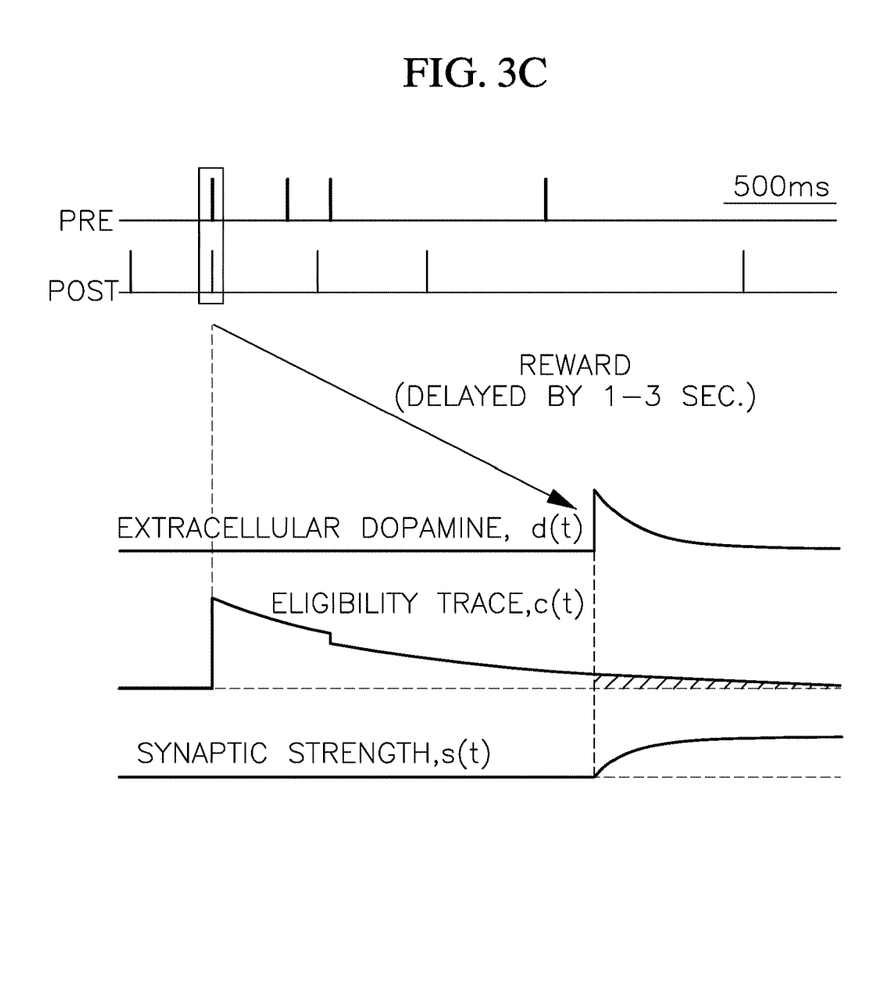

FIGS. 3A-3C depict the dependency of reward modulated spike time dependent plasticity (RSTDP) on pre- and post-synaptic neuron spike timing and the arrival of a reward according to various embodiments of the present disclosure.

Figure 4:
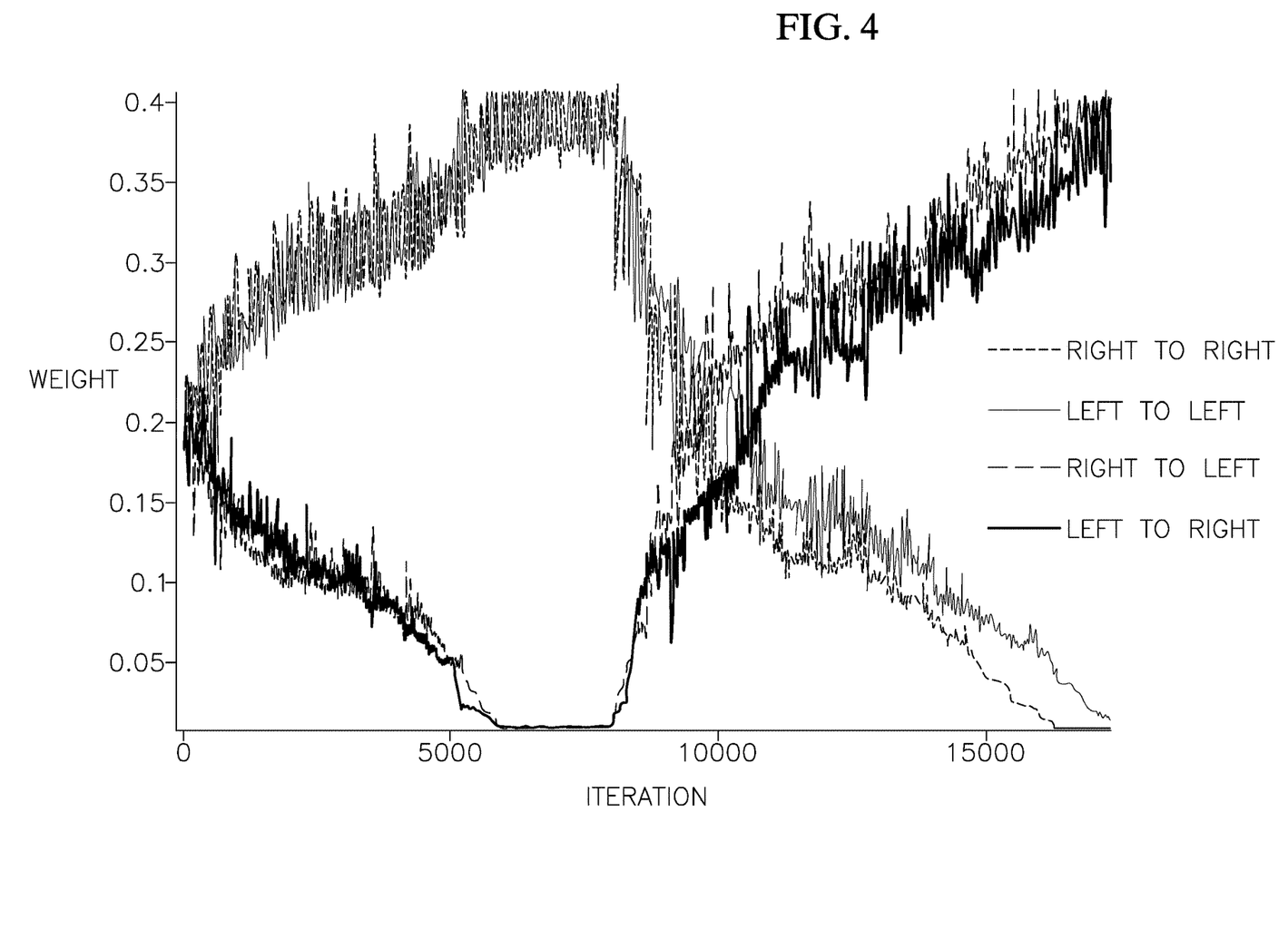
FIG. 4 is a graph depicting the synaptic weight changes between neurons of an artificial network according to one embodiment of the present disclosure.

FIG. 4 is a graph depicting the synaptic weight changes between neurons of an artificial network according to one embodiment of the present disclosure as a function of a number of iterations of the artificial neural network. An iteration refers to an individual call to the artificial neural network. The graph in FIG. 4 was generated from data collected from the artificial neural network 200 illustrated in FIG. 2A that includes two input neurons 202', 202" and two output neurons 204', 204" connected in an all-to-all manner, and the weights in FIG. 4 are for each of the four synaptic connections between the neurons 202', 202", 204', 204". In the graph depicted in FIG. 4, the iterations occurred every 0.3 seconds (or approximately or about every 0.3 seconds) while the vehicle was operated in real time. In one or more embodiments, the iterations may occur with any other suitable frequency, such as less than 0.3 seconds or greater than 0.3 seconds, depending on the desired speed with which the artificial neural network can make adjustments to the direction of the vehicle. The graph in FIG. 4 depicts the connection weights between the neurons in an artificial neural network implemented in an autonomous aerial vehicle (e.g., a drone). The artificial neural network contained eight (8) neurons, including four input neurons configured to receive input from sensors indicating the cardinal direction (e.g., north, east, south, or west) in which the target lies, and four output neurons configured to control the direction of tilt of the autonomous aerial vehicle. The input neurons were directly connected to the output neurons in an all-to-all manner. In one or more embodiments, effective training of the artificial neural network may be accomplished within approximately or about 500 iterations, but significantly more iterations may be required for the connection weights to stabilize. In the embodiment depicted in FIG. 4, the connection weights stabilized after approximately or about 5,000 iterations.

FIG. 4 also depicts the adaptability of the artificial neural network to changing environments and/or sensor damage. After approximately or about 7,500 iterations of the artificial neural network, the left and right inputs (e.g., the inputs from left and right sensors) were reversed. As illustrated in FIG. 4, switching the left and right inputs initially created a significant reduction in performance of the artificial neural network at controlling the autonomous aerial vehicle toward the target, but after approximately or about 10,000 iterations (2,500 iterations after the abrupt change in left and right inputs at 7,500 iterations), the artificial neural network was able to relearn and control the vehicle towards the target, as shown by the connection weights stabilizing at around approximately 10,000 interations. Accordingly, in the illustrated embodiment, the relearning rate of the artificial neural network (i.e., the rate at which the artificial network learned after the sudden reversal of left and right inputs) was significantly faster than the initial learning rate of the artificial neural network.

Figure 5:
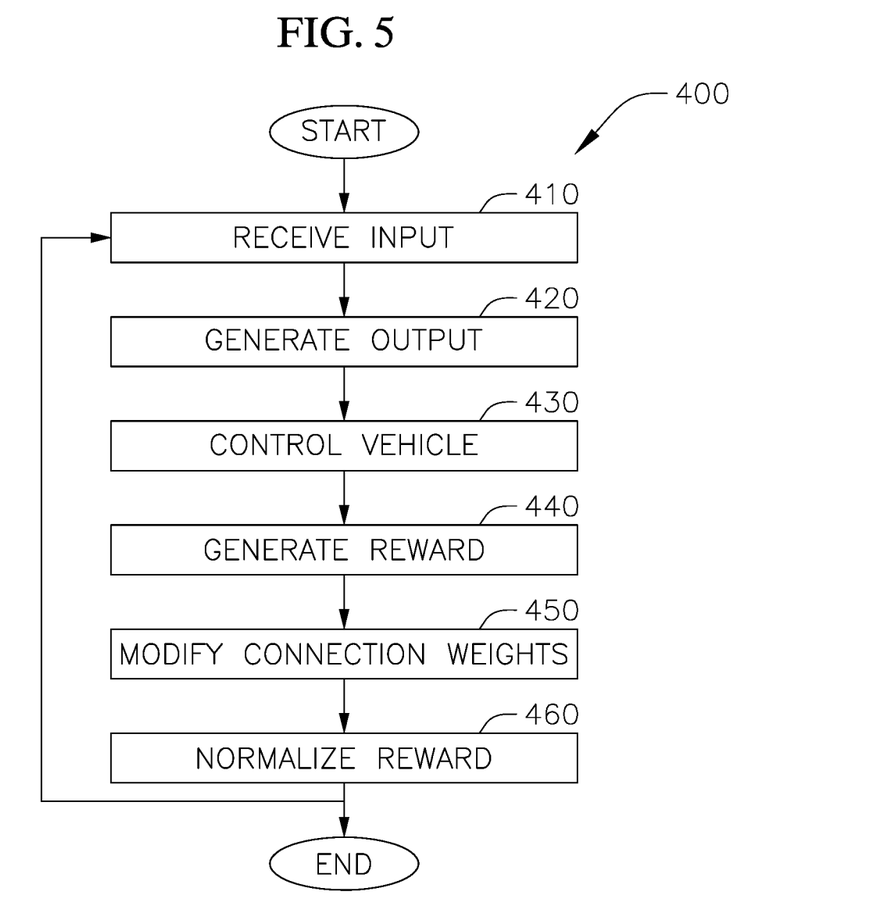
FIG. 5 is a flowchart illustrating tasks of training an artificial neural network and controlling a vehicle with the artificial neural network according to one embodiment of the present disclosure.

FIG. 5 is a flowchart illustrating tasks of a method 400 of training an artificial neural network and utilizing the artificial neural network to control at least one component of an autonomous or semi-autonomous vehicle (e.g., an autonomous or semi-autonomous automobile or aerial vehicle) according to one or more embodiments of the present disclosure. In the embodiment illustrated in FIG. 5, the method 400 includes a task 410 of receiving, at an input layer of the artificial neural network, inputs from one or more sensors (e.g., distance sensors and/or angle sensors) configured to measure and/or determine the distance of the vehicle to a target (e.g., a waypoint) and/or the angle between the vehicle and the target. In the illustrated embodiment, the method 400 also includes a task 420 of generating, at an output layer of the artificial neural network, at least one output based on the at least one input. The method 400 also includes a task 430 of controlling one or more controls of the vehicle (e.g., left and right steering controls of an automobile or tilt controls of an aerial vehicle) based on the output from the neurons in the output layer. In the illustrated embodiment, the method 400 also includes a task 440 of generating a reward based on a comparison between a desired behavior of the vehicle and a behavior of the vehicle resulting from controlling the controls of the vehicle.

In the embodiment illustrated in FIG. 5, the method 400 also includes a task 450 of modifying connection weights between neurons in the artificial neural network based on the reward calculated or determined in task 440. In one or more embodiments, the task 450 of modifying the connection weights includes maintaining a sum of synaptic input weights to each neuron to be substantially constant and maintaining a sum of synaptic output weights from each neuron to be substantially constant (e.g., the task 450 of modifying the connection weights utilizes weight normalization in which the sum of the weights at each neuron in the neural network are held constant or substantially constant as the connection weights between the neurons are adjusted based on an applied reward during training. As described above, weight normalization creates competition for a limited potential synaptic strength between the neurons and thereby prevents or protects the neurons from having excessive input or output strength (e.g., weight normalization prevents the connection weights between neurons from saturating). Additionally, in one or more embodiments, the task 450 of modifying the connection weights may include adjusting weights of the synapses at a set or predetermined regular interval, such as, for instance, 50 ms (or approximately or about 50 ms) or less. In one or more embodiments, the weights of the connections may be adjusted according to Equation 1 described above.

With continued reference to the embodiment illustrated in FIG. 5, the method 400 includes a task 460 of normalizing the long-term average of the reward, calculated or determined in task 440, to be zero or near zero (e.g., approximately or about zero). As described above, a zero-sum reward is configured to prevent or protect commonly presented stimulus response pairs from having a competitive advantage over less frequent stimulus response pairs (e.g. zero sum reward training of the neural network allows the neural network to learn from both rare and common experiences). In one or more embodiments, the task 460 of normalizing the long-term average of the reward to be zero or near zero may be performed according to Equation 2 and Equation 3 described above.

The above-described tasks 410-460 are repeated (e.g., at regular intervals, such as, for instance, every 0.3 seconds or approximately or about every 0.3 seconds) as the artificial neural network learns to control the vehicle. In one or more embodiments, effective training of the artificial neural network may be accomplished within approximately 500 iterations, but significantly more iterations may be required for the connection weights to stabilize (e.g., in one or more embodiments, the connection weights may stabilize after approximately or about 5,000 iterations).

It should be understood that the drawings are not necessarily to scale and that any one or more features of an embodiment may be incorporated in addition to or in lieu of any one or more features in another embodiment. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," "generally" and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims, and equivalents thereof.

What is claimed is:

1. A method of training an artificial neural network having a plurality of layers and at least one weight matrix encoding connection weights between neurons in successive layers of the plurality of layers, the method comprising:
　　receiving, at an input layer of the plurality of layers, at least one input;
　　generating, at an output layer of the plurality of layers, at least one output based on the at least one input;
　　generating a reward based on a comparison between the at least one output and a desired output; and
　　modifying the connection weights based on the reward, wherein the modifying the connection weights comprises maintaining a sum of synaptic input weights to each neuron to be substantially constant and maintaining a sum of synaptic output weights from each neuron to be substantially constant.

2. The method of claim 1, further comprising adjusting the synaptic input and output weights of each neuron according to Equation 1, wherein Equation 1 is:

$$W_n = W_{n-1} * 0.9 + W_{n-1} * \frac{T_{target}}{T_{actual}} * 0.1,$$

wherein $T_{target}$ is a target sum of synaptic input or output weights, $T_{actual}$ is an actual sum of the synaptic input or output weights, $W_n$ is a current weight, and $W_{n-1}$ is a previous weight.

3. The method of claim 2, wherein the adjusting of the synaptic input and output weights is performed at a regular interval.

4. The method of claim 3, wherein the regular interval is about 50 ms or less.

5. The method of claim 1, further comprising averaging the reward over a run time of the artificial neural network to be about zero.

6. The method of claim 5, wherein the averaging the reward comprises calculating a running average score of the reward according to Equation 2, wherein Equation 2 is $X_n = (X_{n-1}*(1-\alpha))+S_n*\alpha$, wherein $\alpha$ is a rate of adaptation and $S_n$ is a score for a given iteration.

7. The method of claim 6, wherein the generating the reward comprises calculating the reward according to Equation 3, wherein Equation 3 is $R_n = S_n - X_n$.

8. The method of claim 1, wherein the artificial neural network is to control an autonomous vehicle.

9. A system, comprising:
a processor; and
a non-transitory computer-readable storage medium operably coupled to the processor, the non-transitory computer-readable storage medium having software instructions stored therein, which, when executed by the processor, cause the processor to:
process input parameters with an artificial neural network stored in the processor;
generate, from the artificial neural network, at least one output based on the input parameters;
generate a reward based on a comparison of between the output and a desired output; and
modify connection weights between neurons in the artificial neural network based on the reward, wherein the modifying the connection weights comprises maintaining a sum of synaptic input weights to each neuron to be substantially constant and maintaining a sum of synaptic output weights from each neuron to be substantially constant.

10. The system of claim 9, further comprising a plurality of sensors, the plurality of sensors configured to generate the input parameters.

11. The system of claim 10, further comprising at least one vehicle component, wherein the processor is configured to control the at least one vehicle component based on the at least one output of the artificial neural network.

12. The system of claim 9, wherein the software instructions, when executed by the processor, further cause the processor to average the reward over a time period to be substantially zero.

13. The system of claim 9, wherein the artificial neural network comprises an input layer and an output layer, and wherein each neuron of the input layer are directly connected to each neuron of the output layer.

14. The system of claim 9, wherein the artificial neural network comprises an input layer, at least one hidden layer, and an output layer.

15. The system of claim 9, wherein the artificial neural network is to control an autonomous vehicle.

16. A method for controlling a vehicle component of a vehicle having a plurality of sensors and a processor in communication with the plurality of sensors, the method comprising:
receiving input parameters from the plurality of sensors;
processing the input parameters with an artificial neural network stored in the processor;
controlling the vehicle component based on output parameters calculated by the artificial neural network;
determining a reward based on a comparison between a desired behavior of the vehicle and a behavior of the vehicle resulting from the controlling of the vehicle component; and
modifying connection weights between neurons in the artificial neural network based on the reward, wherein the modifying the connection weights comprises maintaining a sum of synaptic input weights to each neuron to be substantially constant and maintaining a sum of synaptic output weights from each neuron to be substantially constant.

17. The method of claim 16, wherein the vehicle is an autonomous vehicle.

18. The method of claim 17, wherein the autonomous vehicle is selected from the group consisting of an autonomous automobile and an autonomous aerial vehicle.

19. The method of claim 16, wherein the reward is calculated when the controlling the vehicle causes the vehicle to get closer to a target.

20. The method of claim 16, wherein a value of the reward is calculated in proportion to a decrease in distance between the vehicle and a target after the controlling of the vehicle.

* * * * *